(12) United States Patent
Caveney et al.

(10) Patent No.: US 6,427,952 B2
(45) Date of Patent: Aug. 6, 2002

(54) CABLE MANAGEMENT RING

(75) Inventors: Jack E. Caveney, Hinsdale, IL (US); Joseph A. Dukes, Dawsonville, GA (US)

(73) Assignee: Panduit Corp., Tinley Park, IL (US)

( * ) Notice: Subject to any disclaimer, the term of this patent is extended or adjusted under 35 U.S.C. 154(b) by 29 days.

(21) Appl. No.: 09/738,182

(22) Filed: Dec. 15, 2000

Related U.S. Application Data
(60) Provisional application No. 60/170,814, filed on Dec. 15, 1999.

(51) Int. Cl.[7] .............................. F16L 3/22; F16L 3/08; F16L 3/12; F16B 15/00; F16B 45/00
(52) U.S. Cl. ........................ 248/68.1; 248/71; 248/74.1
(58) Field of Search .................... 248/71, 68.1, 220.31, 248/220.43, 74.2, 74.1; D8/356, 380, 395, 396, 373

(56) References Cited

U.S. PATENT DOCUMENTS

| | | | |
|---|---|---|---|
| 3,339,870 A | 9/1967 | Damsgaard | 248/68 |
| 3,659,319 A | 5/1972 | Erickson | 24/73 |
| 3,944,176 A | 3/1976 | Danko | 248/68 |
| 3,991,960 A | * 11/1976 | Tanaka | 248/68 |
| 4,641,754 A | 2/1987 | Hebel et al. | 211/26 |
| 4,724,612 A | 2/1988 | Pearson | 29/850 |
| 5,090,645 A | * 2/1992 | Zuercher | 248/68.1 |
| 5,145,380 A | 9/1992 | Holcomb et al. | 439/149 |
| 5,153,819 A | 10/1992 | Hebel | 361/429 |
| 5,765,698 A | * 6/1998 | Bullivant | 211/26 |
| D403,235 S | * 12/1998 | Nakamura | D8/356 |
| D411,735 S | * 6/1999 | Bernard | D8/356 |
| 5,921,402 A | 7/1999 | Magenheimer | |
| 5,996,944 A | * 12/1999 | Daoud | 248/68.1 |

FOREIGN PATENT DOCUMENTS

DE 2841349 A1 4/1980

OTHER PUBLICATIONS

"Air/Cable Management Assembley", IBM Technical Disclosure Bulletin, US, IBM Corp., New York, vol. 37, No. 5, May 1, 1994, pp. 531–532.

IBM® Style Vertical Cable Loop, p. 86 from unknown catalog.

Siemon Company Cable Hangers from the Siemon web page.

(List continued on next page.)

*Primary Examiner*—Leslie A. Braun
*Assistant Examiner*—Amy J. Sterling
(74) *Attorney, Agent, or Firm*—Robert A. McCann; Jay A. Saltzman; Christopher S. Clancy

(57) ABSTRACT

A cable management ring for managing the routing paths of electrical or communication wires, cords, cables and other elongated elements includes a pair of arms extending from a baseplate, at least one of the arms being L-shaped and constructed so that it can be rotatably flexed to a fully open position with respect to the other arm. The baseplate of the ring includes one of a variety of mounting mechanism for attaching the ring to a rack or other desired mounting surface.

18 Claims, 6 Drawing Sheets

OTHER PUBLICATIONS

U.S. Patent No. 3,339,870, granted to Damsgaard on Sep. 5, 1967, Reference AA, discloses multiple cable support.

U.S. Patent No. 3,659,319, granted to Erickson on May 2, 1972, Reference AB, discloses an adhesive wire routing clip.

U.S. Patent No. 3,944,176, granted to Danko on Mar. 16, 1976, Reference AC, discloses an universal mounting backboard.

U.S. Patent No. 4,641,754, granted to Hebel et al. on Feb. 10, 1987, Reference AD, discloses a quick connect frame.

U.S. Patent No. 4,724,612, granted to Pearson on Feb. 16, 1988, Reference AE, discloses a method for winding wires to make a harness.

U.S. Patent No. 5,145,380, granted to Holcomb et al. on Sep. 8, 1992, Reference AF, discloses a patch panel.

U.S. Patent No. 5,153,819, granted to Hebel on Oct. 6, 1992, Reference AG, discloses a quick connect frame.

IBM® Style Vertical Cable Loop, p. 86 from unknown catalog, Reference AH, discloses vertical cables.

Siemon Company Cable Hangers from the Siemon web page, Reference AI, discloses cable hangers.

* cited by examiner

CABLE MANAGEMENT RING

CROSS-REFERENCE TO RELATED APPLICATIONS

Applicants claim, under 35 U.S.C. § 119(e), the benefit of priority of the filing date of Dec. 15, 1999, of U.S. Provisional Patent Application Serial No. 60/170,814, filed on the aforementioned date, the entire contents of which are incorporated herein by reference.

BACKGROUND OF THE INVENTION

1. Field of Invention

The present invention relates to a device for managing the routing paths of electrical or communication wires, cords, cables and other elongated elements and more particularly to an improved cable management ring which may be rotatably flexed to an open position which allows access to the maximum extent of the opening, thus permitting easier access for larger cables or bundles of cables.

2. Description of the Related Art

The use of cable management rings in the telecommunication industry has been widespread for a number of years. Commonly made of plastic or metal, some of either are flexible to a certain limited degree. Many must be plastically deformed from original configuration for increased access. Industry standardized racks are used to mount patch panels and other telecommunication devices and the cable management rings are usually installed about the outer periphery of the racks to enable the installers to neatly route the cables out of the way. Thusly, additional installations or rerouting tasks are easily accomplished by the installer adding or removing the desired cables quickly without having to use new mounting elements.

A cable management ring 1 of a common prior art design is shown in FIGS. 13–15. While this ring 1 is similar to the subject invention in that it is generally rectangular or D-shaped and the lower portion 2 thereof is partly flexible, the subject invention differs in that the lower portion is rotatably flexible to a fully open position of at least a full 90° when partially or completely loaded with cables or wires. Additional differences include the downwardly depending end portion 4 of the upper arm 3. This upper arm 3 configuration in fact reduces the fill capacity of the ring 1. Furthermore, the lower arm 2 vertical distal portion 5 also has a reversely curved end section 6. As can be seen from FIGS. 14 and 15, this end section 6 configuration severely limits the extent of opening which can be achieved when a plurality of wires or cables 7 are disposed through the ring 1. Large amounts of wires or cables or large sized wire or cables 7 cannot be removed from or positioned into the ring 1 with this prior art configuration. As a result, the installation is more tedious, time consuming, frustrating, and ultimately costly.

BRIEF SUMMARY OF THE INVENTION

The invention includes a cable management ring having a baseplate, a first arm and a second arm. The first substantially linear arm extends perpendicularly from the baseplate. The second generally L-shaped arm has a distal portion oriented substantially 90 degrees from a substantially linear proximate portion which extends perpendicularly from the baseplate. The second arm is formed of a material and construction selected to provide rotation from a first 90 degree angle to a second 90 degree angle of the distal portion with respect to the proximate portion. The distal portion extends towards the first arm such that a distal end of the distal portion is generally aligned with an outer surface of the first arm.

Preferably, the baseplate includes mounting means for attaching the ring to a mounting surface.

Preferably, the second arm is substantially I-beam shaped.

Preferably, the ring is made of plastic.

DETAILED DESCRIPTION OF THE DRAWINGS

Figure 1:
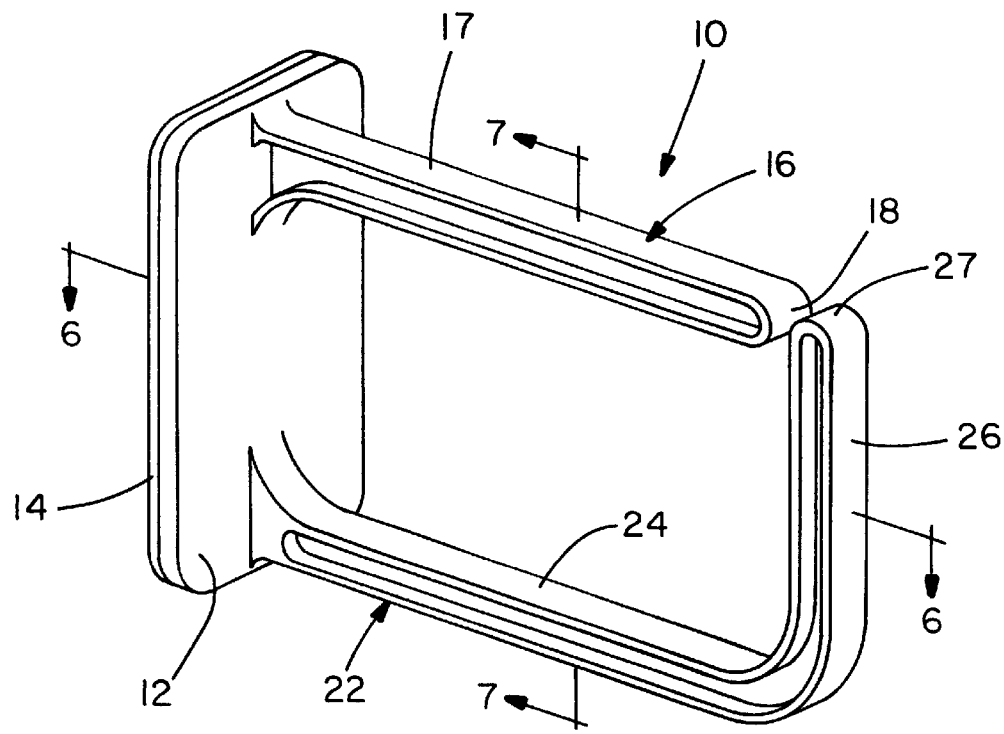
FIG. 1 shows a front left perspective view of a cable management ring of the present invention.

The first embodiment of the subject cable management ring 10 invention, shown in FIGS. 1–7, generally comprises the following features: a substantially planar baseplate 12, a first or upper arm 16 extending generally away from the baseplate in a substantially linear fashion, a second or lower arm 22 which is generally L-shaped, having a distal portion 26 oriented substantially 90° from a proximate portion 24 which extends in a generally linear fashion away from the baseplate 12, wherein the distal portion 26 extends towards the first arm 16 such that a distal end 27 of distal portion 26 is generally aligned with an outer or top surface 17 of first arm 16. The cable management ring 10 in this embodiment is made of a strong but flexible plastic, and includes an adhesive portion 14 on the baseplate 12 which secures the assembly in a desired position on a surface.

Figure 2:
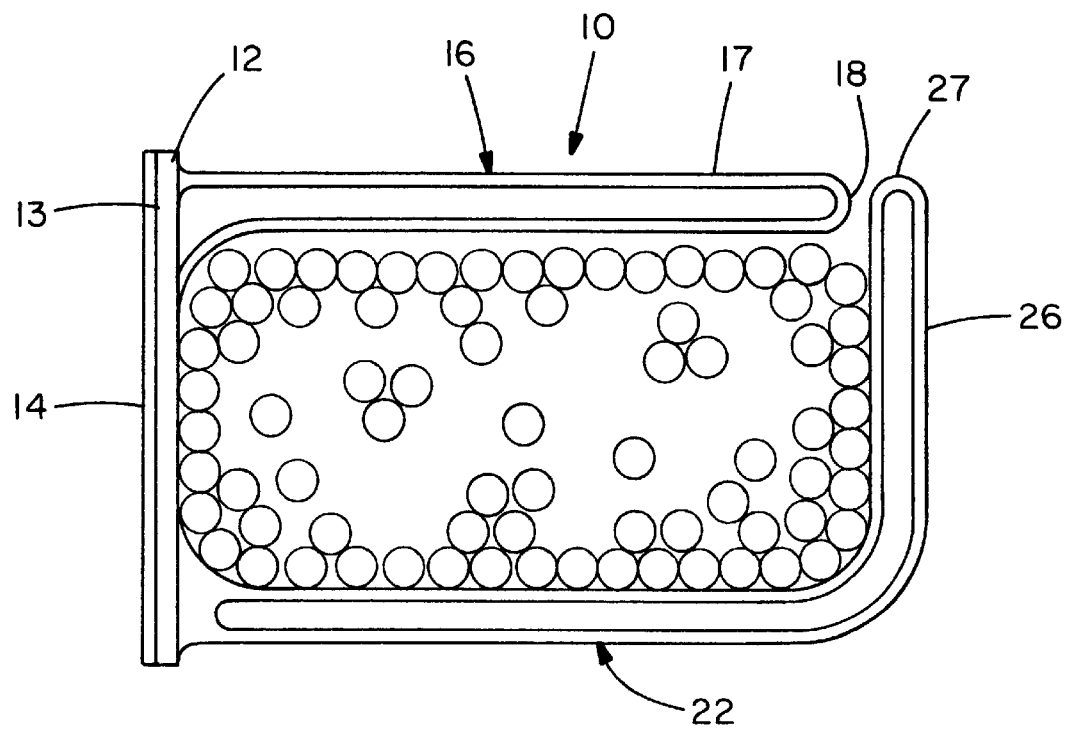
FIG. 2 shows a left side view of the cable management ring of FIG. 1 shown securing a bundle of wires or cables.

As clearly shown in FIGS. 1 and 2, the baseplate 12 is generally rectangular or square shaped and of a suitable thickness to resist deformation and provide a solid foundation for mounting. The adhesive element 14 attached to the back 13 of the baseplate 12 secures the ring assembly 10 to any telecommunications rack or other suitable support. The first arm 16 extends perpendicularly away from the baseplate 12 in a substantially linear fashion for a desired extent. The L-shaped second arm 22 includes a proximate portion 24 that extends perpendicularly away from the baseplate 12 in a substantially linear fashion for a desired extent. The distal portion 26 of arm 22 extends towards arm 16, generally parallel to the baseplate, to a height such that a distal end 27 is in general alignment with the top or outer surface 17 of the upper arm 16. The furthest outward extent 18 of the upper arm 16 lies within and adjacent the uppermost distal end 27 of the lower arm 22.

Figure 3:
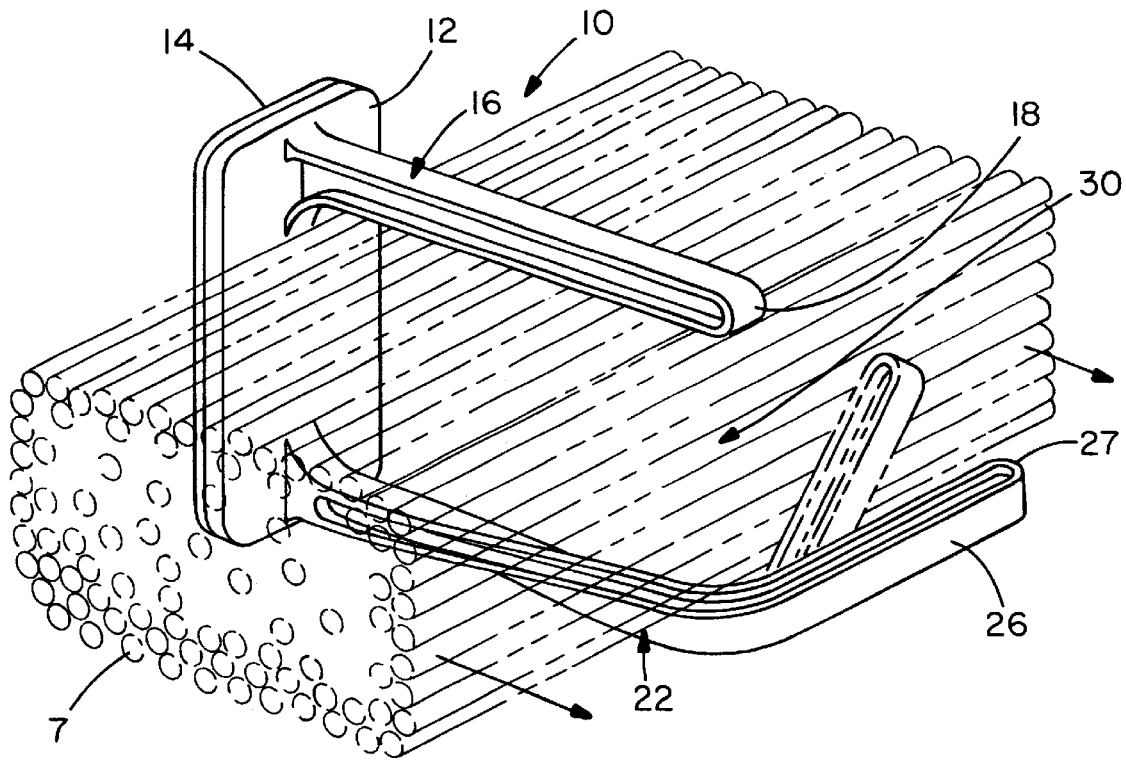
FIG. 3 shows a front left perspective view of the cable management ring of FIG. 1, after the lower arm has been rotated 90 degrees.
Figure 4:
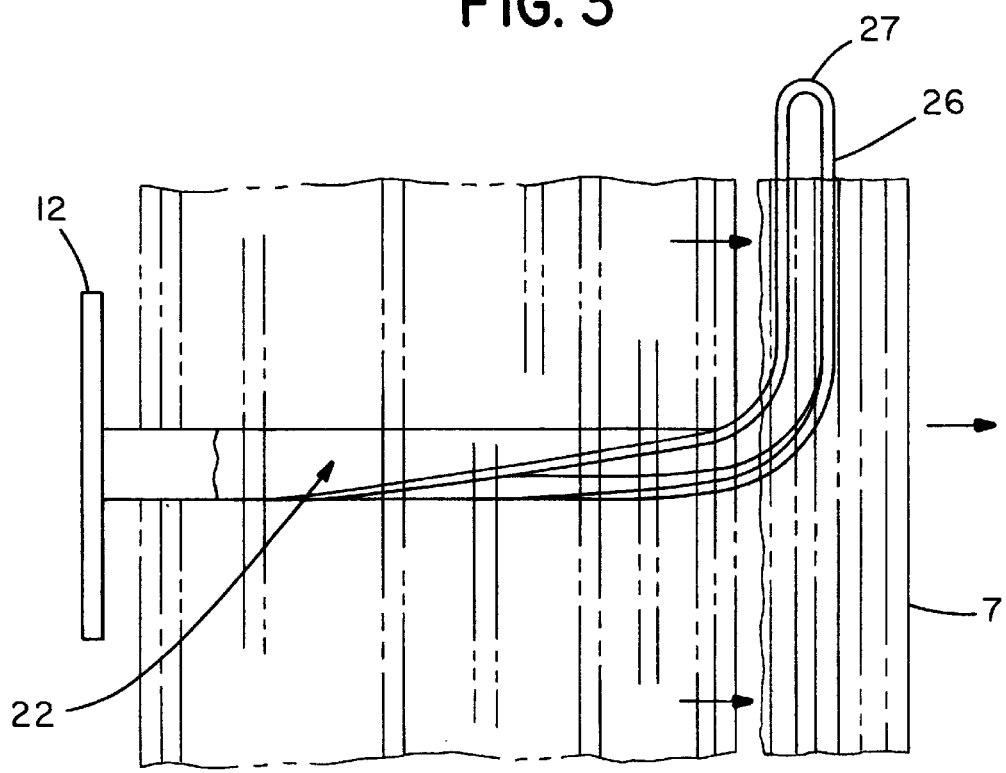
FIG. 4 shows a bottom view of the cable management ring of FIG. 1, after the lower arm has been rotated 90 degrees.
Figure 5:
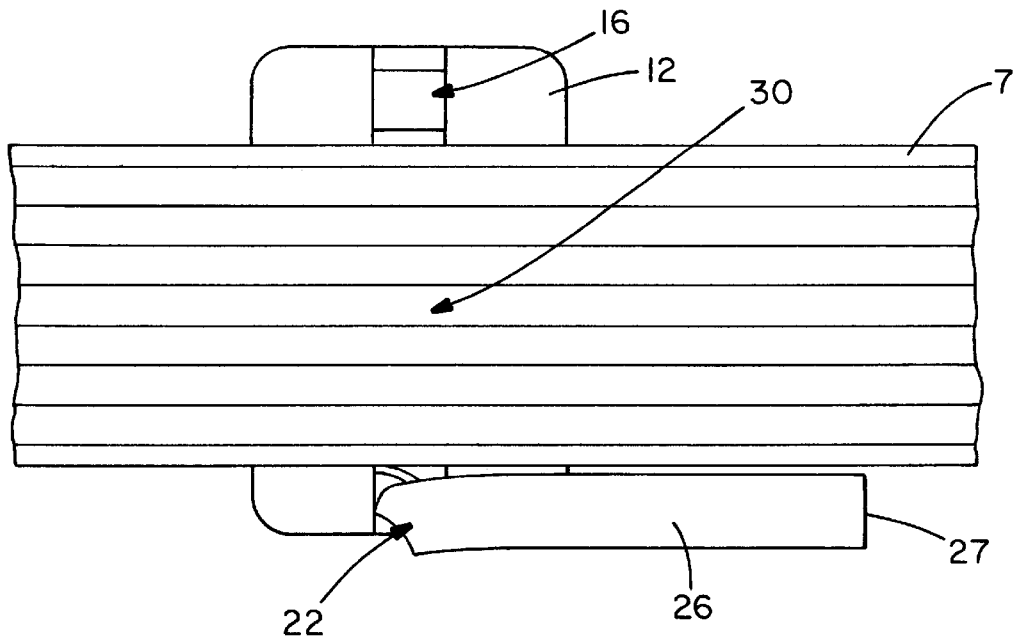
FIG. 5 shows a front view of the cable management ring of FIG. 1, after the lower arm has been rotated 90 degrees.

As shown in FIGS. 3–5, the lower arm 22 may be twisted or rotated in either direction at least 90° and preferably more. The distal, vertically upstanding portion 26 of the L-shaped second arm 22 is used as a lever to twist or rotate the compliant plastic lower arm 22 through an arc of at least 90° and thus provides an opening 30 at the end of the assembly 10 substantially equivalent to the maximum distance between the first 16 and second 22 arms. Consequently, a large number of cables, or large cables 7 may be expeditiously placed in or removed from the cable management ring 10 as a contiguous unit rather than on a piece-by-piece basis as is often required with the prior art structures.

Figure 6:
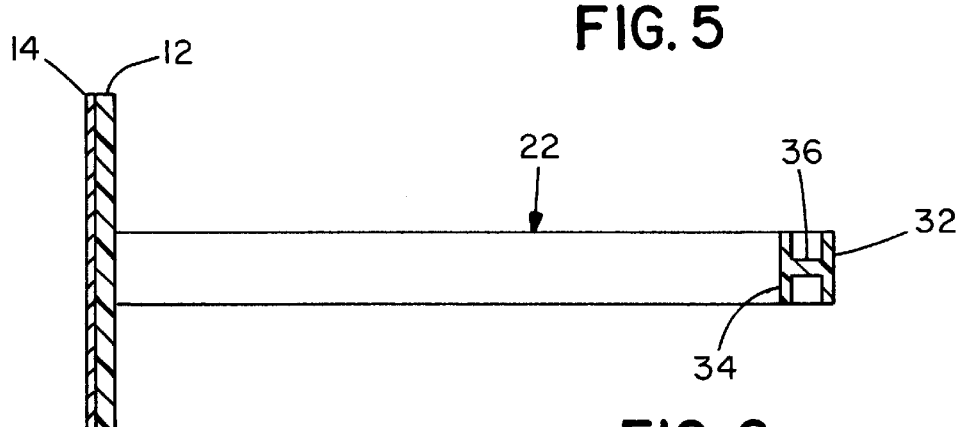
FIG. 6 shows a cross-sectional view of the cable management ring of FIG. 1, taken along line 6—6 of FIG. 1 and looking in the direction of the arrows.
Figure 7:
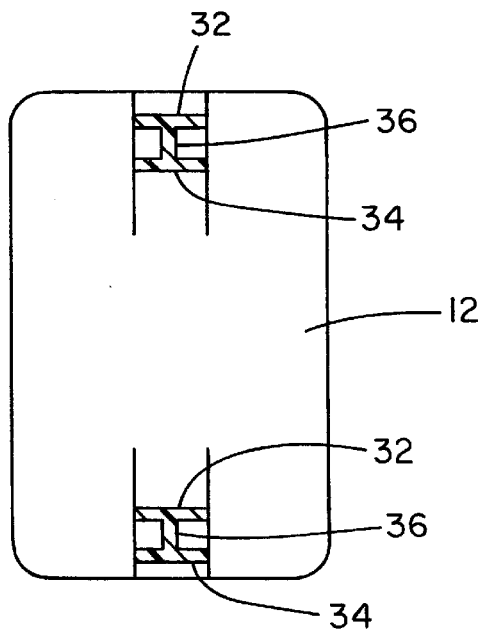
FIG. 7 shows a cross-sectional view of the cable management ring of FIG. 1, taken along line 7—7 of FIG. 1 and looking in the direction of the arrows.

As shown in FIGS. 6 and 7, the first 16 and second 22 arms preferably have similar, substantially I-beam shaped cross sections along the substantial length thereof. The I-beam shape is best shown in FIG. 7, wherein horizontal upper 32 and lower 34 elements are joined by a centrally disposed vertical element 36. This enables both arms, 16 and 22, which are preferably formed of a strong but flexible, resilient plastic material, to have significant resistance to deflection. However, this configuration still permits the distal portion 26 of the second arm 22 to rotate, while the proximate portion 24 thereof twists. The twisting movement thereof may be controlled by the desired cross-section and material selection. As is well known in the prior art, the cross-section may resemble any configuration which achieves the desired result, such as a T, crossed, or oval cross section.

Figure 8:
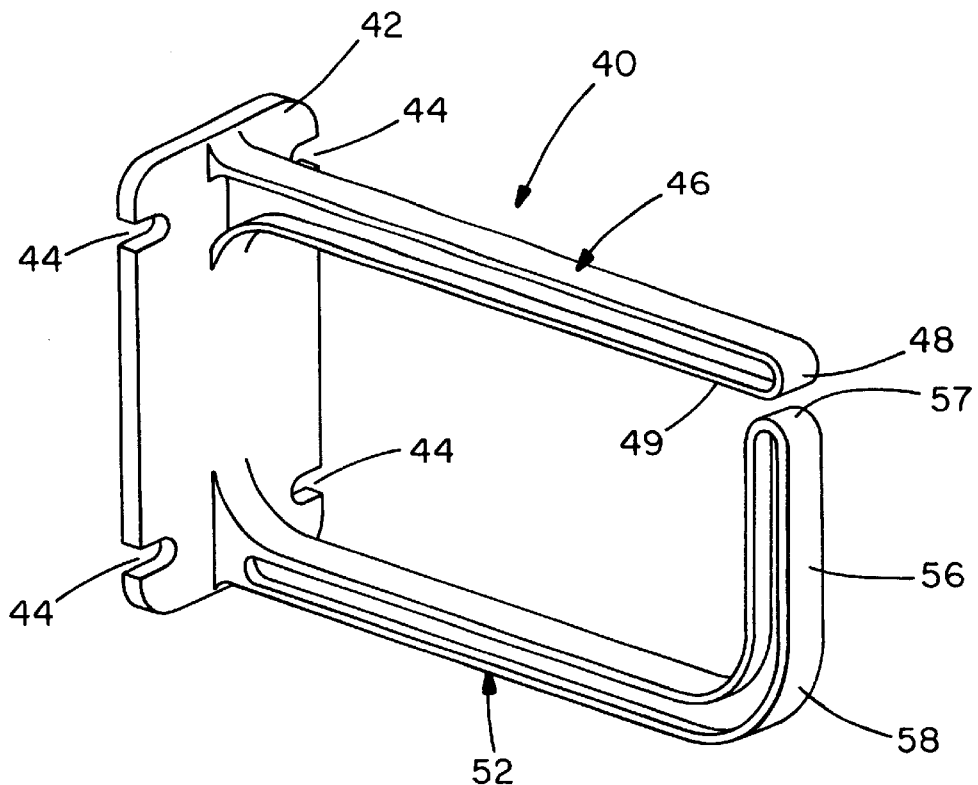
FIG. 8 shows a front left perspective view of another embodiment of the cable management ring of the present invention.

A second embodiment 40 of the present invention is shown in FIG. 8, wherein the baseplate 42 is modified with a plurality of notches 44 which may accept mounting devices therein, and the first 46 and second arms 52 have been slightly reconfigured. Although both the first 46 and second 52 arms retain basically the same physical construction and characteristics, the configuration or positional arrangement of each distal end, 48 or 57, is slightly realigned. The first arm 46 extends in a linear fashion perpendicular to the baseplate 42 as described above for a certain desired extent. The second arm 52, however, has been modified so that the uppermost distal end 57 of the distal portion 56 is disposed adjacent an inner surface 49 of the furthest extent 48 of the first arm 46. Additionally, the outer surface 58 of the furthest distal portion 56 of the second arm is no greater than and in general alignment with the furthest outward extent or distal end 48 of the first arm. In other words, the L-shaped second arm is disposed completely below the first arm. The rotation or twisting of the second arm 52 to create the opening is the same as described above. Additionally, the maximum extent of opening between the first 46 and second arms 52 is achieved as discussed above.

Figure 9:
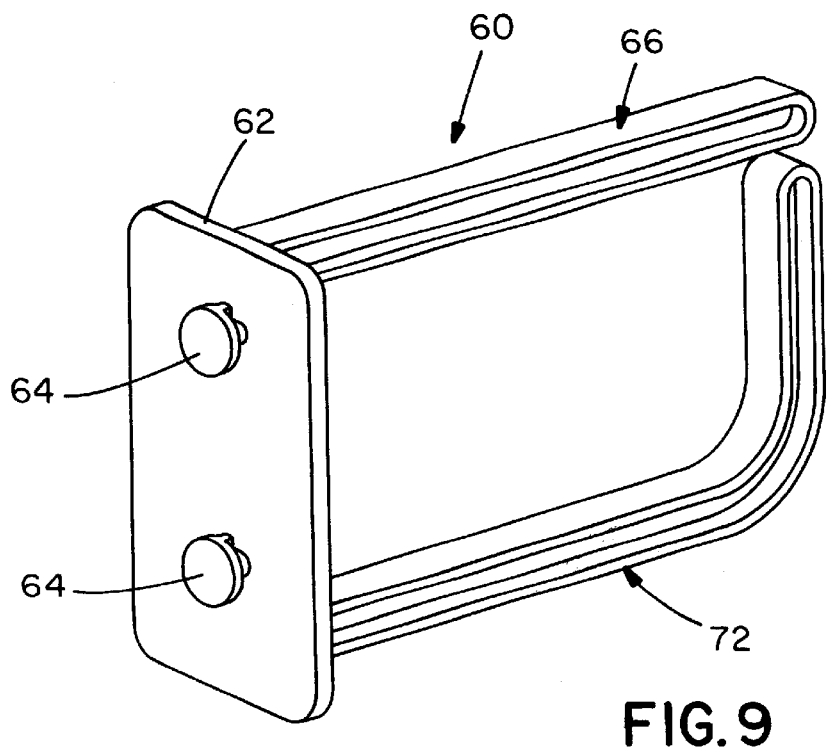
FIG. 9 shows a rear left perspective view of a further embodiment of the cable management ring of the present invention.

A third embodiment 60 of the present invention is shown in FIG. 9, wherein the baseplate 62 has been modified with a pair of button latch elements 64 which are complimentarily shaped to engage standardized apertures disposed on industry standard telecommunications mounting racks. The first 66 and second arm 72 configuration, construction, characteristics and operation is identical to that described above in the second embodiment.

Figure 10:
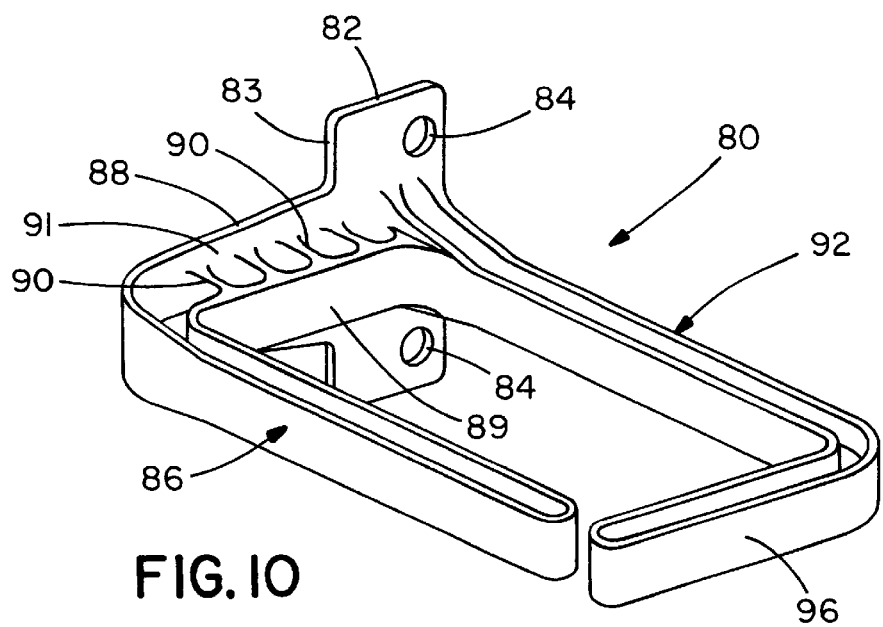
FIG. 10 shows a front left perspective view of yet another embodiment of the cable management ring of the present invention.
Figure 11:
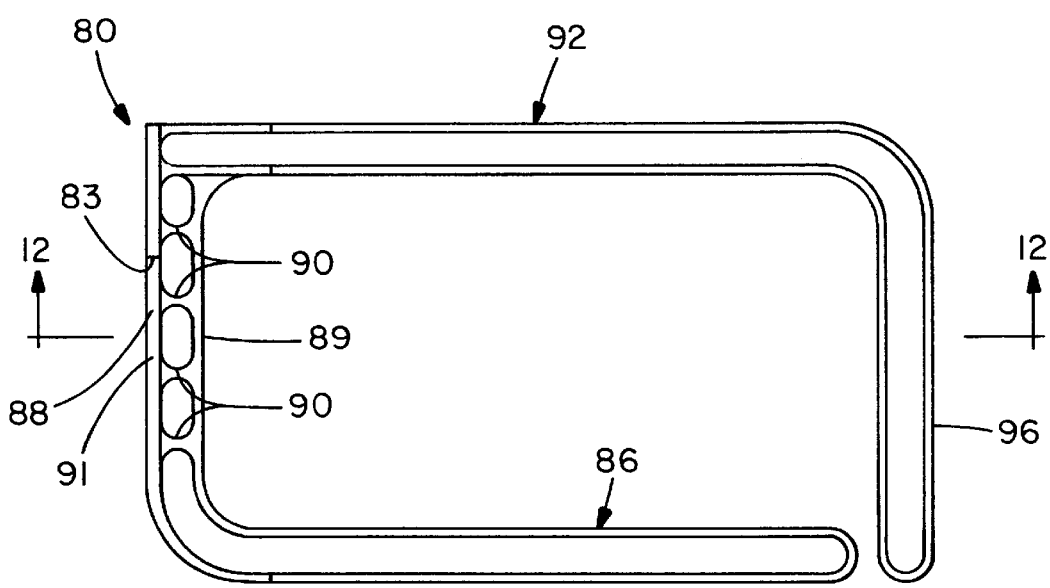
FIG. 11 shows a top view of the cable management ring of FIG. 10.
Figure 12:
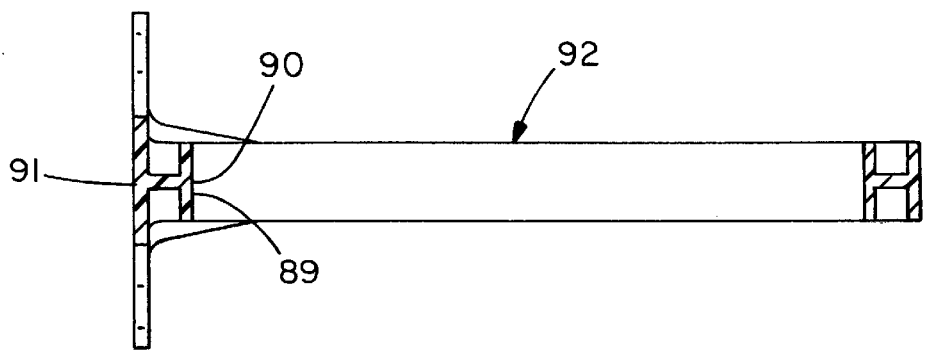
FIG. 12 shows a cross-sectional view of the cable management ring of FIG. 10, taken along line 12—12 of FIG. 11 and looking in the direction of the arrows.
Figure 13:
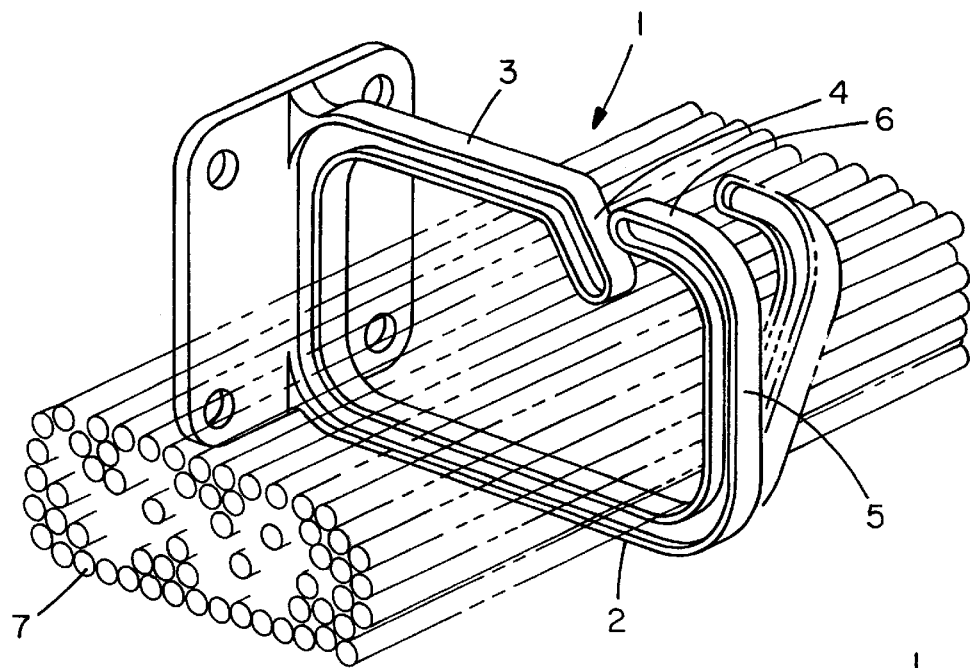
FIG. 13 shows a front left perspective view of a cable management ring according to the prior art.
Figure 14:
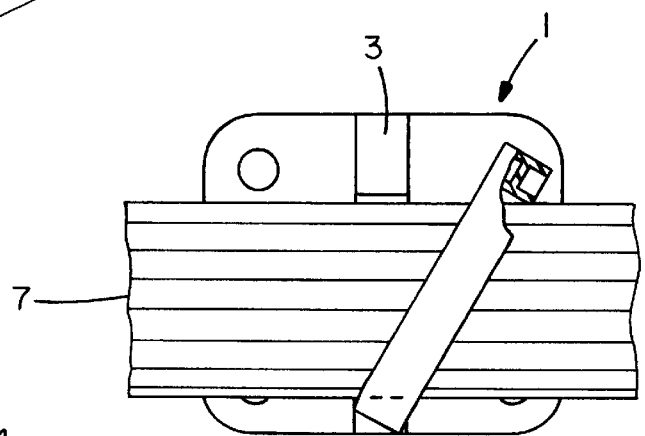
FIG. 14 shows a front view of a cable management ring according to the prior art.
Figure 15:
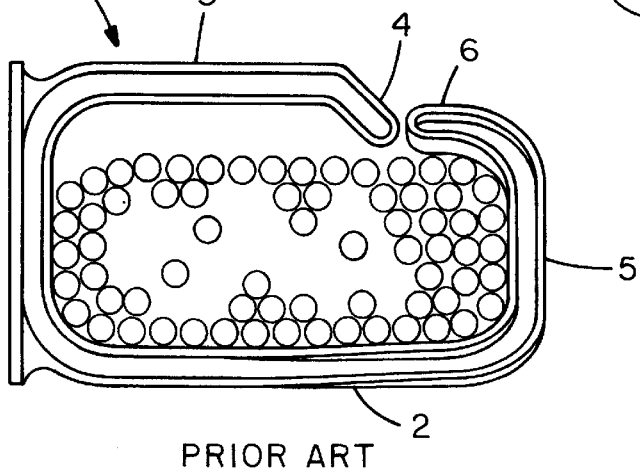
FIG. 15 shows a left side view of a cable management ring according to the prior art.

A fourth embodiment 80 of the present invention is shown in FIGS. 10–12, wherein the mounting base 82 is substantially reduced in size and has a plurality of apertures 84 therethrough which are designed to accept mounting devices. The first arm 86 which is substantially L-shaped extends from the left 83 of the baseplate 82 substantially parallel to a top surface of the baseplate 82 as shown in FIG. 10. The second arm 92, which is generally L-shaped, has a distal portion 96 oriented substantially 90° from the generally linear proximate portion which extends perpendicularly from the baseplate 82. This embodiment is preferably designed to be used in a horizontal orientation where the distal portion 96 of the second arm 92 would be rotated to either an upward or downward orientation.

As can be seen in FIGS. 10, 11 and 12, additional stiffening bars 90, which join the upper 91 and lower 89 portions of the I-beam section, have been added in the proximate portion 88 of the first arm 86 adjacent the baseplate 82. This further increases the torsional stiffness of the first arm 86 and consequently its resistance to twisting or bending when vertical loads are applied. The second arm 92 extends perpendicularly from baseplate 82 shown in FIG. 10 and maintains the same configuration, construction, characteristics and operation as discussed in the previous first embodiment.

While the particular embodiment of the present invention has been shown and described, it will be obvious to those skilled in the art that changes and modifications may be made without departing from the invention in its broader aspects. It should be noted that while a variety of mounting applications have been shown and described, it should be understood that the base could be modified in a wide variety of ways to include various other mounting mechanisms. The matter set forth in the foregoing description and accompanying drawings is offered by way of illustration only and not as a limitation.

What is claimed is:

1. A cable management ring comprising:
   a baseplate;
   a first substantially linear arm extending perpendicularly from the baseplate; and
   a second arm, being generally L-shaped, having a distal portion oriented substantially 90° from a substantially linear proximate portion which extends perpendicularly from the baseplate;
   wherein the second arm is formed of a material and construction selected to provide rotation from a first 90 degree angle to a second 90 degree angle of the distal portion with respect to the proximate portion;
   wherein the distal portion extends towards the first arm such that a distal end of the distal portion is generally aligned with an outer surface of the first arm.

2. A cable management ring according to claim 1, wherein the baseplate includes mounting means for attaching the ring to a mounting surface.

3. A cable management ring according to claim 1, wherein the second arm is substantially I-beam shaped.

4. A cable management ring according to claim 1, wherein the ring is made of plastic.

5. A cable management ring comprising:

a baseplate;

a first substantially linear arm extending perpendicularly from the baseplate;

a second arm being generally L-shaped, having a distal portion oriented substantially 90° from a substantially linear proximate portion which extends perpendicularly from the baseplate;

wherein the second arm is formed of a material and construction selected to provide rotation from a first 90 degree angle to a second 90 degree angle of the distal portion with respect to the proximate portion;

wherein the distal portion extends toward the first arm such that a distal end of the first arm is generally aligned with an outer surface of the distal portion of the second arm.

6. A cable management ring according to claim 5, wherein the baseplate includes mounting means for attaching the ring to a mounting surface.

7. A cable management ring according to claim 6, wherein the second arm is substantially I-beam shaped.

8. A cable management ring according to claim 6, wherein the ring is made of plastic.

9. A cable management ring comprising:

a baseplate having a top surface;

a first arm being generally L-shaped having a distal portion oriented substantially 90° from a proximate portion which extends from the baseplate substantially parallel to the top surface; and a second arm being generally L-shaped having a distal portion oriented substantially 90° from a substantially linear proximate portion which extends from the baseplate perpendicularly to the top surface;

wherein the second arm is formed of a material and construction selected to provide rotation from a first 90 degree angle to a second 90 degree angle of the distal portion with respect to the proximate portion.

10. A cable management ring according to claim 9, wherein the proximate portion of the first arm includes a plurality of stiffening bars.

11. A cable management ring according to claim 10, wherein the first arm is substantially I-beam shaped and the stiffening bars are disposed so as to join an upper and lower portion of an I-beam section.

12. A cable management ring according to claim 9, wherein the baseplate includes mounting means for attaching the ring to a mounting surface.

13. A cable management ring according to claim 10, wherein the baseplate includes mounting means for attaching the ring to a mounting surface.

14. A cable management ring according to claim 9, wherein the ring is made of plastic.

15. A cable management ring according to claim 10, wherein the ring is made of plastic.

16. A cable management ring according to claim 9, wherein the distal portion of the second arm extends towards the distal portion of the first arm such that a distal end of the distal portion of the second arm is generally aligned with an outer surface of the distal portion of the first arm.

17. A cable management ring according to claim 9, wherein the distal portion of the second arm extends towards the distal portion of the first arm such that a distal end of the distal portion of the first arm is generally aligned with an outer surface of the distal portion of the second arm.

18. A cable management ring comprising:

a baseplate having a top surface;

a first arm being generally L-shaped having a distal portion oriented substantially 90 degrees from a proximate portion which extends from the baseplate substantially parallel to the top surface, wherein the proximate portion includes a plurality of stiffening bars;

wherein the first arm is substantially I-beam shaped and the stiffening bars are disposed so as to join an upper and lower portion of an I-beam section; and a second arm being generally L-shaped having a distal portion oriented substantially 90 degrees from a substantially linear proximate portion which extends from the baseplate perpendicularly to the top surface.

* * * * *